(12) United States Patent
Gill (10) Patent No.: US 7,896,040 B2
(45) Date of Patent: Mar. 1, 2011

(54) CLAMP TYPE MORTISING JIG

(76) Inventor: Robert Gill, San Diego, CA (US)

( * ) Notice: Subject to any disclaimer, the term of this patent is extended or adjusted under 35 U.S.C. 154(b) by 129 days.

(21) Appl. No.: 12/099,768

(22) Filed: Apr. 8, 2008

(65) Prior Publication Data

US 2008/0251154 A1 Oct. 16, 2008

Related U.S. Application Data

(60) Provisional application No. 60/911,080, filed on Apr. 10, 2007.

(51) Int. Cl.
*B27C 5/00* (2006.01)
(52) U.S. Cl. ...................................... 144/144.1
(58) Field of Classification Search .................... 144/27, 144/84, 144.1, 144.5, 144.51, 145.1, 372, 144/137; 409/125, 130
See application file for complete search history.

(56) References Cited

U.S. PATENT DOCUMENTS

| | | | |
|---|---|---|---|
| 2,522,400 A | 9/1950 | Polkosnik | |
| D160,734 S | 10/1950 | Polkosnik | |
| 2,814,219 A * | 11/1957 | Zern | 408/31 |
| 4,163,465 A * | 8/1979 | Strong | 144/87 |
| 4,445,277 A * | 5/1984 | Keefe | 33/197 |
| 4,749,013 A * | 6/1988 | Ducate, Sr. | 144/145.1 |
| 4,815,215 A * | 3/1989 | Saylor et al. | 33/197 |
| 4,909,292 A * | 3/1990 | Wirth, Jr. | 144/144.1 |
| 4,914,822 A * | 4/1990 | Wetherington | 33/197 |
| 5,052,454 A * | 10/1991 | Meinhardt | 144/144.51 |
| 5,067,537 A * | 11/1991 | Offner | 144/372 |
| 5,146,961 A * | 9/1992 | Schoeller | 144/3.1 |
| 5,154,214 A | 10/1992 | Hagerman | |
| 5,325,899 A * | 7/1994 | Kochling | 144/144.1 |
| 5,458,171 A * | 10/1995 | Ward | 144/84 |
| 5,494,089 A * | 2/1996 | Lubbe | 144/144.1 |
| 5,511,312 A * | 4/1996 | Hobbs | 30/167.1 |
| 5,813,807 A * | 9/1998 | Rogers | 409/178 |
| 5,893,402 A * | 4/1999 | Darling | 144/372 |
| 6,039,095 A * | 3/2000 | Newman | 144/144.52 |
| 6,065,913 A * | 5/2000 | Rogers | 409/178 |
| 6,343,632 B1 * | 2/2002 | Zivojinovic | 144/27 |
| 6,363,982 B1 * | 4/2002 | Nixon, Jr. | 144/144.51 |

* cited by examiner

*Primary Examiner* — Dana Ross
*Assistant Examiner* — Jennifer Chiang
(74) *Attorney, Agent, or Firm* — Michael D. Eisenberg (57) ABSTRACT

A clamp type mortising jig is described that allows the user to create a slot mortise in a workpiece clamped in the jig, using a plunge router. The jig includes a clamp that includes a movable jaw assembly and a fixed jaw with a template carriage slidably mounted between them. Router guide templates can be replaceably mounted in the template carriage.

19 Claims, 5 Drawing Sheets

Fig. 5B

CLAMP TYPE MORTISING JIG

RELATED APPLICATIONS

This application claims the benefit of Gill, U.S. Prov. Pat. Appl. 60/911,080, filed Apr. 10, 2007, entitled CLAMP TYPE MORTISING JIG, which is hereby incorporated herein by reference in its entirety, including drawings.

FIELD OF THE INVENTION

The present invention relates generally to mortising jigs and more specifically it relates to a clamp type mortising jig used with a plunge router that allows the user to create a slot mortise with a plunge router and a clamp type jig.

BACKGROUND OF THE INVENTION

The following discussion is provided solely to assist the understanding of the reader, and does not constitute an admission that any of the information discussed or references cited constitute prior art to the present invention.

Certain clamp type jigs for use with rotary tools having cutting bits have been described. U.S. Pat. No. D160,734 and U.S. Pat. No. 2,522,400 to Polkosnik show a doweling jig having a carriage slideable on two parallel rails connected between two stationary members. A significant problem with the clamp type jigs such as Polkosnik's is that they are designed to guide drill bits for making holes for receiving dowels and are not suitable for guiding a plunge router to form a slot mortise that would typically receive a tenon such as would be desirable for the construction of frame-type furniture.

U.S. Pat. No. 5,154,214 to Hagerman describes a mortising jig for use with a router or other tool to form finish or shallow mortises for mounting hardware. A significant problem with existing clamp type mortising jigs such as Hagerman's is that they are designed for making mortises for hardware and are not suitable for forming mortises for receiving tenons as would be desirable for use in frame-type furniture construction.

SUMMARY OF THE INVENTION

The present invention concerns clamp type mortising jigs. These mortising jigs generally include a clamp that includes a movable jaw and a fixed jaw connected together in a manner which maintains the respective jaws in proper orientation to each other, typically with parallel faces. Mounted between the jaws is a template carriage, which can also be referred to as a template holder, on which router guide templates can preferably be replaceably mounted. The template carriage or holder can be conveniently positioned and locked as desired in the gap between the jaws. Thus, the present jigs are well adapted for cutting slot mortises in workpieces at essentially any desired position across the width of the workpiece.

Thus, a first aspect of the invention provides a clamp type mortising jig that includes a movable jaw assembly and a fixed jaw connected together by a pair of alignment bars, e.g., by guide rods, upon which a template carriage (which can have a template mounted in it) is slidably mounted. The fixed jaw is usually an elongated structure, e.g., an L-shaped structure, the top surface of which provides a tool support for the baseplate of a plunge router and the front surface provides substantial area for engaging a workpiece. The front surface can also be equivalently referred to as the face or the workpiece bearing surface. The movable jaw assembly includes a support or bracket, which is an elongated, substantially rigid structure, often a generally rectangular solid structure, with a top surface that is flat, often rectangular in shape, and coplanar with the top surface of the fixed jaw, and which provides a tool support for the baseplate of a plunge router. That bracket provides a support against which a movable jaw can operate for clamping. The bracket has, slidably attached to it on the side proximal to the fixed jaw, a movable jaw that is an elongated structure that is often essentially solid (e.g., an essentially rectangular solid structure), has a surface for engaging a workpiece and is adjustable, e.g., with a screw and knob assembly or other such mechanism for applying and holding pressure against a workpiece. The guide bars (e.g., rods) connect the fixed jaw and the movable jaw assembly and provide slide structures for slidably attaching the template carriage. For example, the guide bars can pass through close fitting holes or channels in the template carriage. The template carriage is a structure (e.g., a generally rectangular solid structure), usually an elongated structure, with a longitudinal slot and is slidably attached to the guide bars. The template carriage has one or more screws or other fastening mechanisms for removably attaching mortising templates, and may also have one or more dowel pins or other mechanisms for repeatably and accurately locating removably attachable mortising templates. The template carriage has a lock(s) (e.g., thumbscrew(s) for locking the carriage to the guide bars, and highly preferably has registration features for aligning the jig to layout lines on a workpiece. The templates are flat plates or sheets (e.g., plastic sheet material (which may be transparent) or thin metal sheets such as aluminum, brass, or bronze sheets) that can be removably attached to the template carriage and have slots formed in them for the purpose of guiding a plunge router fitted with a template guide bushing. Preferably the template carriage has a slot that is overlaid by the slot in the template when the template is mounted in the carriage. Also preferably, the centerlines of the template slot when the template is mounted in the template carriage (and preferably also the template carriage slot) are coincident with the registration features on the template carriage.

A related aspect concerns a clamp-type mortising jig for use with a router (usually a plunge router), and includes a clamp that includes a movable jaw assembly and a parallel fixed jaw connected by at least one alignment connector, and between which a template carriage is repositionably mounted, e.g., using one, two, or more guide bars or guide rods. The fixed jaw includes a fixed jaw body that has a top tool support surface and a substantially flat workpiece bearing surface that is substantially perpendicular to the top tool support surface. The movable jaw assembly includes at least one adjustable clamp member. In some embodiments, the face of the adjustable clamp member is substantially parallel to the workpiece bearing surface of the fixed jaw or the face of adjustable clamp member conforms to the adjacent surface of a workpiece clamped in the jig. The clamp holds a workpiece between the workpiece bearing surface of the fixed jaw and the adjustable clamp member, allowing a plunge router resting on the tool support surface to produce a cut in the workpiece defined by a template mounted in the template carriage.

In particular embodiments, the movable jaw assembly also includes a top tool support surface, which is preferably coplanar with the top tool support surface of the fixed jaw and/or is an elongated, often generally rectangular surface; the movable jaw assembly includes a bracket or support that includes an elongated structure having a flat top surface that is coplanar with the top surface of the fixed jaw and provides a tool support surface for the baseplate of a plunge router (preferably that bracket is connected with and held in fixed, spacedapart relation to the fixed jaw, e.g., using one, two, or more alignment rods or bars), and adjustably attached thereto a movable jaw (e.g., having an elongated structure) having a surface or surfaces for engaging a workpiece and a moving and tensioning mechanism (which can also be referred to as an adjusting and tightening mechanism or adjusting and tensioning mechanism) (e.g., one or two adjustment screws or a slide bar(s) with a cam action tensioner); the movable jaw assembly includes a bracket and adjustably attached thereto a movable jaw having an elongated structure and at least one jaw orientation device, e.g., at least one guide rod rigidly attached to the movable jaw and sliding within a close tolerance through bore in the bracket; the movable jaw assembly includes a bracket as described and at least one (e.g., one or two) moving and tensioning mechanism terminated on the end proximal to the fixed jaw with a workpiece bearing surface (for example, one or more adjustment screws bearing a flattened end plate (preferably a floating plate rather than a rigidly attached plate) for bearing against a workpiece); the moving and tensioning mechanism includes at least one adjustment screw (e.g., one or two) fitted within a threaded through bore(s) in the bracket, which may be an elongated structure as described.

In certain embodiments, the at least one alignment connector is one alignment bar; the at least one alignment connector is two alignment bars; the at least one alignment bar is an alignment rod or rods; the at least one alignment bar is a substantially rectangular bar; at least one (in many cases two) alignment bars (which may be rods) also serve as guide bars or rods for a template carriage; a template carriage is slidably mounted on an alignment bar or rod (or a pair of such bars or rods) using a channel(s), through passage(s), or through bore(s) (preferably close tolerance channels, passages, or through bores) in the template carriage; a guide rod (or a pair of guide rods) on which a template carriage is mounted has a flattened side and the template carriage includes a position lock (e.g., a screw or cam lock) which when tightened bears against that flattened side.

With respect to the template carriage, in certain embodiments, the template carriage includes an elongated structure (e.g., a plate-like structure) having a longitudinal slot (e.g., centrally located across the width and/or length of the elongated structure); the template carriage includes a fastening mechanism for removably attaching mortising templates (e.g., a locking screw or cam lock) and/or positioning features, e.g., one, two, or more alignment pins or a surface(s) against which a template is urged for precise positioning); the template carriage includes at least one guide rod lock (e.g., a lock screw or cam lock); the template carriage is configured to mount a template (which may be mounted in the template carriage) which is as described for templates in the aspect below concerning templates in a template set.

In certain embodiments, the template carriage includes at least one (e.g., 1, 2, 3, or 4) workpiece alignment features (also referred to as registration features); an alignment feature is placed for aligning a workpiece in a direction parallel to the workpiece bearing surface of the fixed jaw and/or the alignment feature is placed for aligning the template carriage at a desired position in a direction perpendicular to the workpiece bearing surface of the fixed jaw.

In connection with an alignment feature placed for aligning a workpiece in a direction parallel to the workpiece bearing surface of the fixed jaw, in particular embodiments the alignment feature includes a formed pointer projecting from a wall of a slot in the template carriage and/or the alignment feature includes a line (e.g., a groove and/or contrasting color line such as a painted line) located on a wall of a slot in the template carriage and/or an alignment feature is located on an outer side surface of the template carriage (e.g., a formed pointer, groove, and/or contrasting color line).

In connection with an alignment feature placed for aligning the template carriage at a desired position in a direction perpendicular to the workpiece bearing surface of the fixed jaw, in particular embodiments the alignment feature is located on an outer end of the template carriage and/or the alignment feature is located on a surface of a slot formed in said template carriage (e.g., on an end or both ends of the slot) and/or an alignment feature includes a formed pointer, groove, or contrasting color line.

A related aspect concerns a mortising jig kit that includes a mortising jig as described for one of the preceding aspects or otherwise described herein for the present invention, and also including a plurality of templates, e.g., 2, 3, 4, 5, 6, 2-5, 3-7, 6-10, or even more templates. The kit can further include instructions for using the mortising jig.

Likewise, in another related aspect, the invention provides a mortising jig template set, including at least one template which is an elongated piece of substantially rigid sheet material sized and configured to removably mount in a clamp type mortising jig, wherein the piece of sheet material has a long axis and has an elongated slot parallel with that long axis sized to fit a router template guide bushing, preferably a standard-sized router template guide bushing.

In certain embodiments, the elongated slot is centered across the width and/or length of the piece; the set includes a plurality of the templates, e.g., 2, 3, 4, 5, 6, 2-5, 3-7, 6-10, or even more, each usually having substantially identical outside dimensions; the set includes a plurality of templates, e.g., 2, 3, 4, 5, 6, 2-5, 3-7, 6-10, or even more, each of which has an elongated slot of different length, e.g., including one or more of about 1.0, 1.25, 1.5, 1.75, 2.0, 2.5, 3.0, 3.5, and 4.0 inches in length; the set includes a plurality of templates having slots of different widths, e.g., sized to fit a plurality of different guide bushings; the template (or each of a plurality of templates) includes at least one alignment pin hole, e.g., 1, 2, 3, or 4 such holes and/or the template (or each of a plurality of templates) includes at least one mounting screw hole, e.g., 1, 2, 3, or 4 such holes; the piece of sheet material is plastic (e.g., clear plastic such as polycarbonate, acrylic, polyethylene terepthalate, polyvinyl chloride, polystyrene), fiber reinforced plastic, metal, aluminum, bronze, or steel; the sheet material has a thickness of 0.010 to 0.200, 0.010 to 0.125, 0.020 to 0.125, 0.030 to 0.070, or 0.30 to 0.50 of an inch.

Yet another related aspect concerns a method for forming a mortise in a workpiece. The method involves operating a plunge router to cut a mortise in a workpiece clamped in a mortising jig as specified for one of the above aspects or otherwise described herein for the present invention.

In particular embodiments, the method includes making perpendicular layout lines (e.g., two such lines), which may be continuous or broken, on a workpiece marking the center of a desired mortise and/or registering the mortising jig with layout lines on a workpiece; registering the mortising jig with layout lines on a workpiece involves positioning (usually by sliding) the template carriage in alignment with a lateral positioning layout line and locking the template carriage in place, and sliding the jig along the workpiece to register the jig with a longitudinal positioning layout line. In this context, with the workpiece in the clamp bearing against the fixed jaw face, the lateral positioning layout line will be parallel to the fixed jaw face of the clamp, and the longitudinal positioning layout line will be perpendicular to the fixed jaw face. Usually registering the jig with the respective layout lines involves aligning registration features on the template carriage with the corresponding layout lines.

The present invention is described in connection with use of a plunge router. It should be understood that while use of a plunge router is highly preferred, a basic router without plunge capability can be used, even if such use is less convenient.

As used herein, the term "bar" refers to a straight elongated member with substantially uniform outside cross-sectional shape and dimension. A "rod" is a bar that has a circular outside cross-sectional shape. Thus, as used herein, the term "guide bar" refers to a bar which guides the motion of a component of the apparatus. The cross-sectional shape of a guide bar may be of many different types, but is most commonly round or rectangular. Similarly, as used herein, a "guide rod" is a guide bar having a round outside cross-sectional shape.

The terms "alignment bar" refers to a bar that connects two or more components and holds them in a desired alignment or orientation. Commonly the desired alignment or orientation is a fixed alignment, e.g., parallel. The fixed alignment or orientation may include a fixed distance between the components. Similar to the above, the term "alignment rod" refers to an alignment bar which has a round outer cross-sectional shape. More generally, the term "alignment member" refers to a structural component of essentially any shape that connects two or more components and holds them in a desired alignment or orientation.

With respect to the connection between a fixed jaw and a movable jaw assembly in the present jigs, the term "alignment connector" means a component of the jig that is connected directly or indirectly to the fixed jaw and at least one component of the movable jaw assembly such that the fixed jaw and that component of the movable jaw assembly are maintained in substantially a designed alignment, usually in parallel alignment. Such alignment connector may, for example, be a bar, plate, or other shape component(s). In many cases, two such connectors will be used, such as two alignment rods.

Additional embodiments will be apparent from the Detailed Description and from the claims.

BRIEF DESCRIPTION OF THE DRAWINGS

Various features and attendant advantages of the present invention will become better understood and fully appreciated when considered in conjunction with the accompanying drawings, in which like reference characters designate the same or similar parts throughout the several views.

FIG. 3 shows perspective views of exemplary templates of the present invention.

FIG. 5 is a perspective view of two alternate movable jaw assemblies in which the moving and tensioning mechanism also provides the workpiece bearing surface(s).

DETAILED DESCRIPTION OF THE PREFERRED EMBODIMENTS

The present invention provides an advantageous mortising jig that is simple to use and provides accurate and reproducible slot mortises. The jig is also adaptable to forming dowel holes, and the like. This mortising jig is designed to hold the workpiece aligned and registered in a clamp, such that the base of a router, generally a plunge router, used in conjunction with the jig rests stably on a flat upper surface. The jig utilizes replaceable templates mounted in the jig for defining the cut for the mortise.

Highly preferably the jig is configured such that it has features that allow the user to easily and accurately register the jig to layout lines on a workpiece. The jig allows the user to readily make mortises in any grain orientation of the workpiece, including on the end grain, and further allows the mortising jig to be conveniently used even with workpieces that are long or heavy.

This clamp type mortising jig can be sized to clamp to a large range of workpiece sizes, including, for example, common sized workpieces found in frame-type furniture construction, and allows for the creation of a practical variety of mortises in terms of length and width.

Clamp Assembly

As indicated above, the present mortising jigs are based on a clamp assembly which holds a workpiece in position for cutting a mortise using a router, generally a plunge router. The clamp assembly can be configured in a number of different ways. In general, the clamp assembly includes a fixed jaw. The fixed jaw may essentially be a single component fixed jaw, buy may also include more than one component. Connected to that fixed jaw is a movable jaw assembly that includes at least one movable jaw. The movable jaw may be of a variety of different shapes and designs and may have various types of workpiece bearing surfaces, e.g., an elongated rectangle or a circular surface. The movable jaw assembly is connected with the fixed jaw such that a work piece can be securely clamped between the fixed jaw and the movable jaw. The jaws also include one or more tool support surfaces or are attached to one or more tool support members having such surfaces. The base of the plunge router (or other cutting tool used similarly) rides on the tool support surfaces while the mortise is being cut. Together, the tool support surfaces define a tool support plane. Highly preferably, the connection between the fixed jaw and the movable jaw assembly is such that the top surfaces of the connector(s) between them do not protrude above the level of the tool support plane. In this context it should be recognized that the connector(s) themselves may include the tool support surface(s) or may be connected to a member or members that include the tool support surface(s). The connectors may also serve one or more additional functions (e.g., as guide bars for movement of a movable jaw and/or a template carriage), or may only serve as connectors which maintain the spatial relationship of the fixed jaw and movable jaw assembly and allow the workpiece clamping.

Some advantageous embodiments, such as that shown in the drawings, incorporate two alignment bars that hold the fixed jaw and movable jaw assembly in fixed, usually parallel, relation to each other. In such embodiments, the fixed jaw is a substantially rigid, preferably elongated structure which has a workpiece bearing surface (also referred to as the front face) on the side proximal to the movable jaw assembly, and a top surface which functions as a tool support surface (e.g., together with the top surface of the movable jaw assembly) for the plunge router base. Typically, the plane defined by the tool support surface and the plane defined by the workpiece clamp face are at right angles to each other.

The movable jaw assembly in such embodiments includes a rigid, usually elongated, body against which a movable clamp jaw works. That is, in advantageous embodiments, the movable jaw assembly includes a component, which may be referred to as a support or bracket, and a movable jaw, where the support provides a structure allowing the movable jaw to be forced against a workpiece. In many embodiments, the support or bracket is essentially rigidly attached to the connector(s) between the fixed jaw and the movable jaw assembly. In many cases, the clamp is tightened using a full threaded screw or screws which pass through a threaded through hole or holes in or securely attached to the fixed support, but other tightening mechanisms may also be used, e.g., quick release threaded thightener (e.g., with a half-threaded female portion), a cam tightener(s), pneumatic cylinder, and the like. In most cases, the tightening mechanism will include one or two tighteners.

Particularly in jigs in which a single tightening mechanism is used, it can be beneficial to use at least one alignment slide or other alignment mechanism to keep the movable jaw in proper orientation to the fixed jaw. For example, a movable jaw that has a single central screw adjustor would tend to rotate with the adjustor screw in the absence of an alignment mechanism. The alignment mechanism can, for example, be at least one or preferably two alignment slide rods. Such alignment slide rods can be rigidly mounted on the back of the movable jaw and slide within close tolerance through bores in the fixed support portion of the movable jaw assembly.

As an alternative to an elongated movable jaw, the movable jaw assembly may include one or more (preferably two) tighteners which are terminated on the workpiece ends with a workpiece bearing member or portion. Preferably the workpiece bearing member or portion does not rotate as the tightener is being tightened against a workpiece being clamped. Such workpiece bearing member or portion may, for example, be a swivel end similar to those common for C-clamps and the like, or a free-rotation end (e.g., an end that provides rotational freedom while the terminal surface remains in substantially a fixed plane).

Other clamp configurations can also be provided. For example, a clamp can be used that has only one elongated fixed side, which is the fixed jaw. Opposing that fixed jaw is one or more movable jaws, but without the type of fixed support as described above. Preferably the movable jaw is constructed and linked with the fixed jaw in a manner such that the the tops of the fixed jaw and the movable jaw provide a consistent tool support surface for supporting the router during use. One way of accomplishing this is if the movable jaw is mounted on alignment guides (e.g., slides) which are rigidly mounted to the fixed jaw. Those alignment slides maintain the vertical relationship of the fixed and movable jaw assemblies. Such alignment slides can also be constructed to function as part of the tightener assembly. One way of accomplishing this is to use relatively large diameter slides that are hollow and threaded inside with a slot. The clamp face can attached to threaded rods that thread inside the alignment slides with connection pieces that pass through the slot.

Another example of a configuration that uses a clamp that has a fixed jaw and a movable jaw has the movable jaw mounted on threaded screws that have sufficient size and depth of mating female threaded fitting in the fixed jaw and sufficiently close tolerance to maintain positional stability. Though not necessary, in this design, the threaded screws can advantageously be linked such that they turn in concert such that the face of the movable jaw is maintained parallel to the face of the fixed jaw.

In yet another alternative, the jig includes a fixed jaw and a movable jaw assembly, where the movable jaw assembly is attached to guide bars (usually two) that extend through sliding fit holes through the fixed jaw. On the back side of the fixed jaw, the guide bars are attached to a tightener support bracket. A tightening mechanism (e.g., a screw adjustor) works by pushing against the fixed jaw, forcing the tightener support bracket away from the back of the fixed jaw, and thereby pulling the movable jaw assembly towards the fixed jaw.

Yet another alternative utilizes a plate-like top connector that also connects the fixed jaw and the movable jaw assembly. The top surface of that top connector serves as the tool support surface. In most cases, the fixed jaw is attached essentially rigidly to the top connector (or is formed integrally with it). The movable jaw assembly is also usually connected to the top connector, e.g., with a slideable connection or connections (e.g., with a guide bar(s), guide slot(s), or guide track(s)). As with the other alternative designs described, the movable jaw assembly includes one or more adjustable members having clamp faces (i.e., workpiece bearing surfaces) and one or more adjusting and tightening mechanisms, such as adjustment screws, that push or pull the adjustable members against a workpiece in the jig clamp. Of course, in order to accomplish the clamping action, the adjusting and tightening mechanisms must work against a support. Such support may be provided, for example, by the top connector or extensions therefrom, or by the fixed jaw. For example, a projection extending downward from the top connector may have a threaded through hole, through which a mating adjustment screw passes. The end of the adjustment screw can push against a movable jaw that is slidably connected with a pair of guide bars, slots, or tracks. Those guides assist in maintaining the workpiece bearing surfaces of the fixed jaw and the movable jaw in parallel relation. The guides can, for example, extend between the fixed jaw and the projection from the top connector. The top connector also usually includes an adjustable template mount. The template mount may, for example, be a template carriage or a mounting area allowing templates to be mounted in desired positions. The mounting area will commonly include an opening associated with the template carriage or mounting area. A template carriage the same or similar to that described above may be used. Such carriage can slide on any of a number of different alignment structures, such as alignment bars and slide channels. Instead of a slideable carriage, template positioning and mounting may be accomplished by other mechanisms providing adjustable positioning. For example, templates may be adjustably mounted using surface clamps at the edges of the opening of the mounting area. In any case, the mounting mechanism allows templates to be interchanged and to be securely mounted at a large plurality of positions across the width of a workpiece.

For each of the configurations, the top of the jaw assembly forms or is attached to bearing surfaces (which can also be referred to a tool support surfaces) on which a router base rests and slides for forming a mortise. As indicated, in many cases the tool support surface includes the tops of both the fixed jaw and the movable jaw assembly. However, in an alternative, the tool support surface may include and/or be attached to only one of the clamp jaw assemblies. More often, that one assembly would be the fixed jaw. In such embodiments, the top of the jaw assembly includes a widened section or has attached to it a component that is sufficiently wide to provide an acceptably stable support surface for the router base, e.g., at least 2, 3, 4, or 5 inches wide. In such designs, the tops of the fixed jaw and the movable jaw assembly would often not be co-planar; the top of the jaw assembly which does not include the tool support surface would be at least be lower than the top of the tool support surface.

The jaws can also include other features. For example, the elongated structure of the fixed jaw may include a recess (often similar in shape to a dado) into which the template carriage (e.g., as described below) can fit. This can result in that elongated structure having a generally L-shaped cross-section. The lower leg of the L provides the front face (i.e., the workpiece bearing surface) that contacts a clamped workpiece, while the template carriage can be moved toward the vertical portion of the L. The recess can advantageously be sized in complementary relation to the template carriage such that when the template carriage is positioned as close as possible to the fixed jaw, the slot in a template mounted in the template carriage will be centered on a workpiece of minimum width for clamping in the jig without the need for a shim(s).

In addition, it is advantageous in some cases for the workpiece clamp face of the fixed jaw and/or the face of the movable jaw to include a recess in the area where a mortise will be cut in a workpiece, e.g., centered on the mortise position. This can be particularly advantageous when the material remaining at one or both of the sides of the mortise will be thin because if at least the face of the clamp adjacent to the thin section does not include such recess, it can cause the thin section of mortise side to bend inward. That inward bend can cause the resulting mortise to be improperly and/or inconsistently shaped.

The clamp components for these jigs may be constructed of any of a variety of different materials. Of course, because effective clamping is needed, the components involved in the clamping should have good strength. Without limitation, examples of materials which may be used include steel, aluminum, bronze, plastics (which may be fiber reinforced), and composite materials (e.g., composite plastic materials). Suitable adjustments to the thickness and/or reinforcing of components for particular jigs may be readily made depending on the material used. In cases where materials having limited wear durability are used, more durable inserts or facings may be provided. For example, where a plastic is used for a fixed jaw support which has a threaded bore for a movable jaw adjustment screw, the threaded bore may have a threaded metal insert, e g., a steel or bronze insert, which substantially increases the resistance of the threads to wear.

Template Carriage and Templates

For any of the designs, between the opposing jaws of the clamp is located a mortise template carriage or template holder. The template carriage includes a body to which, in most cases, replaceable templates can be attached. The template carriage is attached to the clamp structure of the jig in a manner allowing the carriage to be positioned at a desired lateral position between the opposing jaws. Such positioning allows the user to locate the mortise at essentially any point across a workpiece clamped in the jig. While the carriage or the template position can be configured in a manner allowing position adjustment along the workpiece (generally parallel to the fixed jaw face), in most designs the position of the template carriage and template are essentially fixed in that direction, and adjustment of the template position with respect to a workpiece along that parallel direction is accomplished by moving the entire jig. Though the top of the template carriage with mounted template may be designed to be at various heights, it is in many cases beneficial if the top is slightly below the level of the tool support surface. Such positioning prevents the base of the router from contacting the template or template carriage, resulting in greater stability for the router and/or less wear or degradation to the top surface of a mounted template (if present).

The attachment and positioning of the template carriage to the clamp can be accomplished in a number of different ways. In embodiments such as that shown in the drawings, the fixed jaw and the movable jaw assembly are connected to each other using two parallel alignment rods attached near the ends of the respective fixed and movable clamp assemblies. Those alignment rods can also function as slides for the template carriage. That is, the ends of the template carriage include passages, e.g., through bores, through which the alignment rods are fitted. The template carriage can therefore slide laterally on those rods to a desired position. Once in the desired position, the template carriage can be locked or clamped in place, e.g., using one or more thumb screws or cam locks, or the like.

In alternate configurations, the template carriage can be moved on a single alignment rod or bar, and/or the template carriage may be connected to the rod or bar in a different manner. For example, a template carriage may slidably ride on a rod or bar, e.g., within a 3-sided channel rather than within a through bore. The template carriage can then be locked in a desired position using a thumb screw or cam lock or the like.

The body of the template carriage may be made of any of a variety of different materials that have good strength, dimensional stability, and formability. Examples include aluminum, bronze, plastics (which may be fiber reinforced), and composite materials such as composite plastics. When materials are used which may experience excessive wear, additions may be made to provide greater useable life, e.g., by include durable threaded inserts, durable wear plates, and the like.

In preferred designs, the template carriage includes a body portion (e.g., a section of plate-like material) to which the template is mounted and which includes features for positioning on the clamp portion of the jig. In particularly advantageous designs, the plate-like body portion is elongated in a direction parallel to the face of the fixed jaw and includes a through slot (often essentially centered in both the longitudinal and lateral directions of the body). In use, the router bit extends through this slot to contact the workpiece for cutting. Typically, the slot in the carriage will therefore be at least the length and width of the corresponding slot in the guide template having the largest guide opening.

Highly preferably the template carriage includes registration or alignment features for alignment of the template with mortise layout lines on the workpiece, which highly preferably mark the center of the intended mortise. This can be usefully described with respect to a template carriage having a body with a slot as just described. In a template carriage, indentations or protrusions or other features (e.g., painted lines and/or laser engraved lines or other marks) can provide the registration features. The registration features may be located proximal to the location where the router bit will be inserted, e.g., on an inside surface(s) of the slot as described, and/or more distal, e.g., on an outside surface(s) of the carriage body. Thus, for example, registration features may be located on one or both ends of the slot and/or on one or both outside ends of the carriage body. Likewise, registration features may be located on the insides of one or both sides of the slot, and/or one or both of the lateral sides of the carriage.

As indicated, the registration features may be of a number of different types. These include, for example, inscribed lines (which may or may not be colored differently from the base material, colored lines without inscribing (e.g., black lines), or projections (e.g., a narrow ridge or pointer). Highly preferably the registration feature is located at or extends substantially to the bottom of the template carriage body such that it is in close proximity to the top surface of a workpiece clamped in the jig. Combinations of different types of registration features may be used in a single template carriage.

In advantageous embodiments, the registration features are located such that they are on the imaginary midlines of the template slot when the template is installed in the template carriage. That is, a line drawn through the longitudinal midline of the template slot will be aligned with the longitudinal registration features. Similarly, a line drawn through the midline of the template slot perpendicular to the longitudinal midline will be aligned with the lateral registration features.

Alternatively or additionally, narrow light beams (e.g., laser beams) could be used for a registration feature, but such an approach can add to the cost and complexity. Also alternatively or additionally, registration features may be included in the template. For example, lines may be inscribed or formed in or on the template, preferably along the template midlines. However, such registration features in the template are not currently preferred as the only registration features because in most designs those features would not be sufficiently close to the layout lines on the workpiece to consistently prevent alignment errors. One implementation of registration features on the templates which can, at least in part, overcome the distance of the template from the workpiece. That is, with a transparent template, registration lines may be made as vertically aligned pairs in both the top and bottom of the template. Thus, there would be a vertically aligned pair of longitudinal registration lines and a vertically aligned pair of lateral registration lines. Alignment of the two lines of a pair with the corresponding layout mark on the workpiece indicates that the template is properly positioned in the corresponding direction. This system of alignment features works best if the templates are not too thin. For example, a template of roughly ⅛ inch thickness provides suitable sighting distance.

In accordance with the preceding description, the template carriage is designed to accept replaceable mounting of guide templates, usually on the top surface or in a recess in the top surface of the template carriage. Such templates are typically formed from sheet material, such as sheet plastic (which may be transparent), steel, bronze, aluminum, and the like. The template material should be of sufficient strength and rigidity to provide consistent, substantially non-deflecting surfaces for a router guide bushing.

The templates can be mounted in the template carriage in any of a variety of different ways. In the embodiment illustrated in the drawings, a combination of mounting screws and alignment pins is used. A template is first fitted over close-fitting alignment pins which position and orient the template. The template is then held in place using screws (in this case located near the ends of the template) that pass through the template into matching threaded bore holes in the template carriage. Alternatives include mounting of templates using a close tolerance recess with the template held using screws or a retaining clip or frame, and a mounting where the template slides into a mounting slot, and is maintained in position using a screw, clip, spring, or the like. Whatever the mounting method used, it is desired that the template be positioned within close tolerances and held with substantially no movement during routing operations.

Exemplary Mortising Jig

An exemplary embodiment of this invention is illustrated in the accompanying drawings, but it should be understood that the drawings are illustrative only, and that changes may be made in the specific construction illustrated. Turning now to the drawings, in which similar reference characters denote similar elements throughout the several views, the drawings illustrate a particular embodiment of the present clamp type mortising jig used with a plunge router. Of course, in additional embodiments, the design may be readily varied in accordance with the description herein; thus, the invention is not limited to the illustrative embodiment shown.

Figure 1:
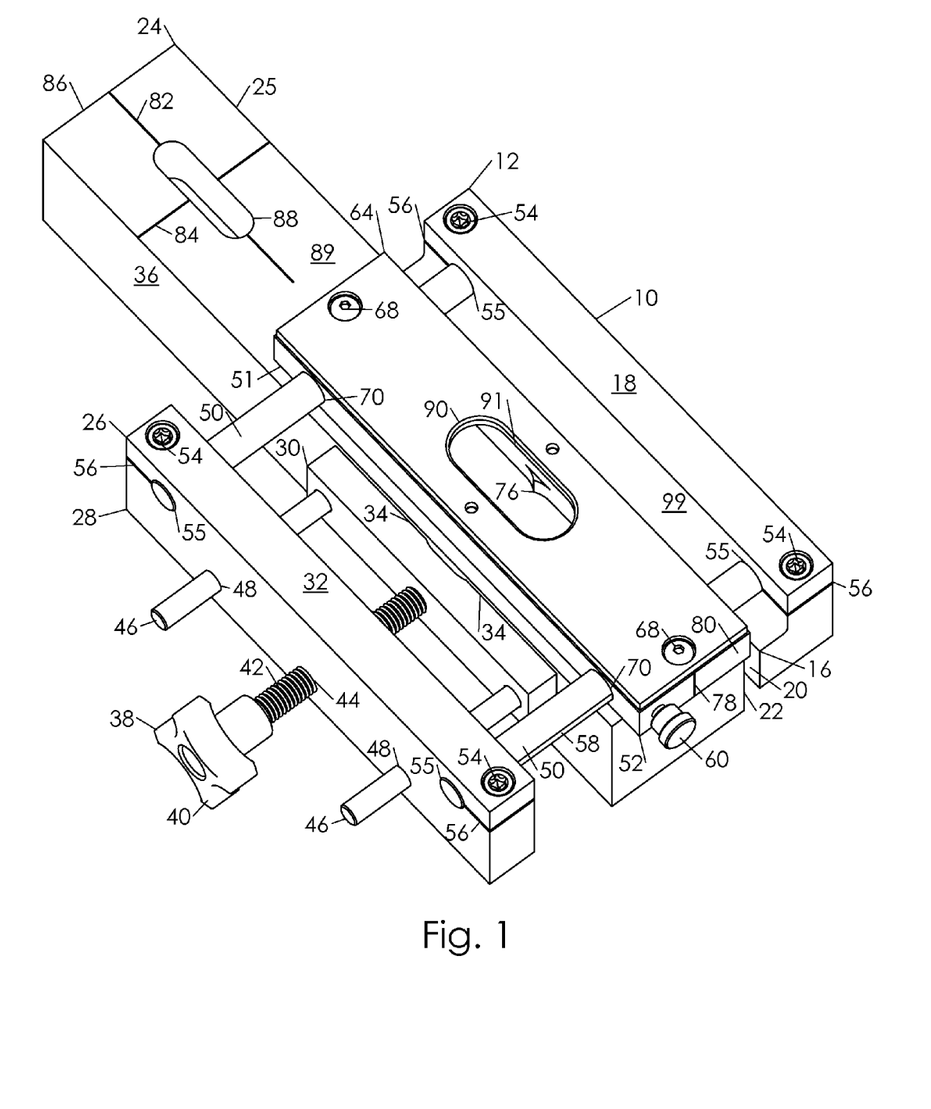
FIG. 1 is a perspective view of an exemplary embodiment of the present invention shown clamped to a workpiece.

Referring to FIG. 1, the fixed jaw 12 is essentially an elongated L-shaped structure, preferably made of aluminum, though it may be made of other formable materials having sufficient strength and rigidity for the application. The fixed jaw has a flat rectangular top surface 18 that provides the first of a pair of coplaner tool support surfaces upon which a plunge router base plate (not shown) is supported during use. The lower extended portion 16 of the fixed jaw 12 has a flat rectangular front surface 20 that is perpendicular to surface 18, serves as a datum, and is in contact with and bearing against first clamping surface 22 of workpiece 24. The fixed jaw 12 is presently composed of one L-shaped part but could be formed as two or more machined, extruded or otherwise manufactured parts. For example, the portion forming the horizontal leg of the L can be a separate part fastened to the vertical portion, such as with screws. The fixed jaw 12 is presently made of aluminum but could be made of other suitable materials such as steel, bronze, high strength plastic, and/or plastic composites. Similarly, while the illustrative fixed jaw is a generally rectangular solid, L-shaped assembly, clearly the shape can be varied, e.g., with shapes that differ from generally rectangular and/or not L-shaped, while still providing a flat workpiece bearing surface and flat tool support surface.

Again referring to FIG. 1, in this embodiment and as indicated above, the movable jaw assembly 26 is essentially composed of the bracket 28 and the movable jaw 30. The bracket 28 is, in this case, a rectangular solid in shape, preferably made of aluminum, and has a flat rectangular top surface 32 that is coplanar with surface 18 of the fixed jaw 12 and composes the second of a pair of coplaner tool support surfaces upon which a plunge router base plate (not shown) is supported during use. In this particular example, movable jaw 30 is a rectangular solid in shape, preferably made of aluminum, and is movably attached to the bracket 28 via knob assembly 38 and two guide rods 46. Movable jaw 30 has two flat coplanar surfaces 34 that are bearing against second workpiece clamping surface 36 of workpiece 24. Similarly, while the illustrative bracket 28 and movable jaw 30 are generally rectangular solids in shape, clearly the shape can be varied, e.g., with shapes that differ from generally rectangular but provide the same function. The bracket 28 and the movable jaw 30 are presently made of aluminum but could be made of other suitable materials such as steel, bronze, high strength plastic, and/or plastic composites.

Figure 2:
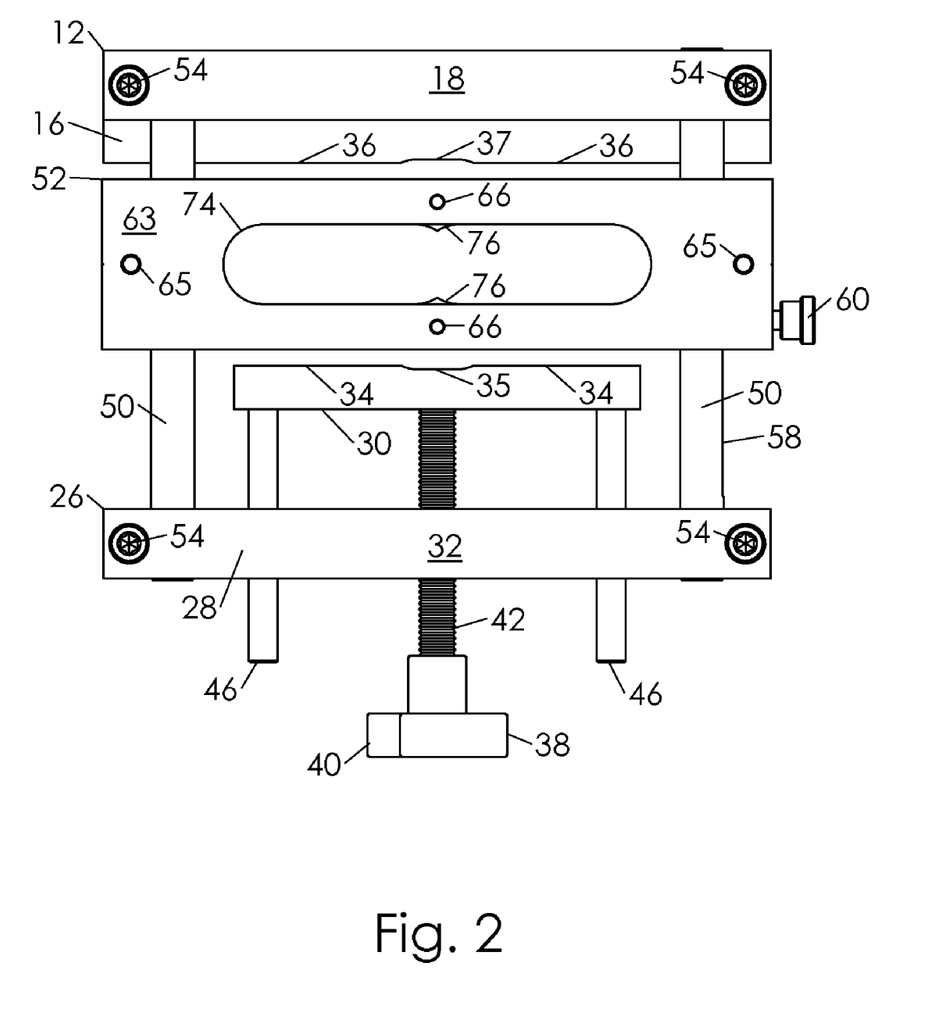
FIG. 2 is a top view of the exemplary embodiment of FIG. 1 shown without the template attached.

Referring to FIG. 2, as an optional feature, material has been removed in the area numbered 35 of movable jaw 30 and the area numbered 37 of fixed jaw 12 so that the clamping force generated by knob assembly 38 is distributed over the area that is composed of surfaces 34 on movable jaw 30 and surfaces 36 on fixed jaw 12. It is advantageous, especially when forming a mortise in a thin workpiece with a clamp type jig, that the force generated by the knob assembly 38 is distributed away from the central area numbered 35 of movable jaw 30 and the area numbered 37 of fixed jaw 12 so as not to compress the thin walls that are left on the workpiece into the bit as the mortise is being routed.

Referring to FIG. 1, knob assembly 38 includes knob 40 and threaded rod 42. Threaded rod 42 passes through tapped hole 44 formed in bracket 28 and is attached to movable jaw 30. Two parallel guide rods 46 are connected to movable jaw 30, are preferably made of stainless steel, and pass with a sliding fit through bores 48 formed in bracket 28.

Figure 4:
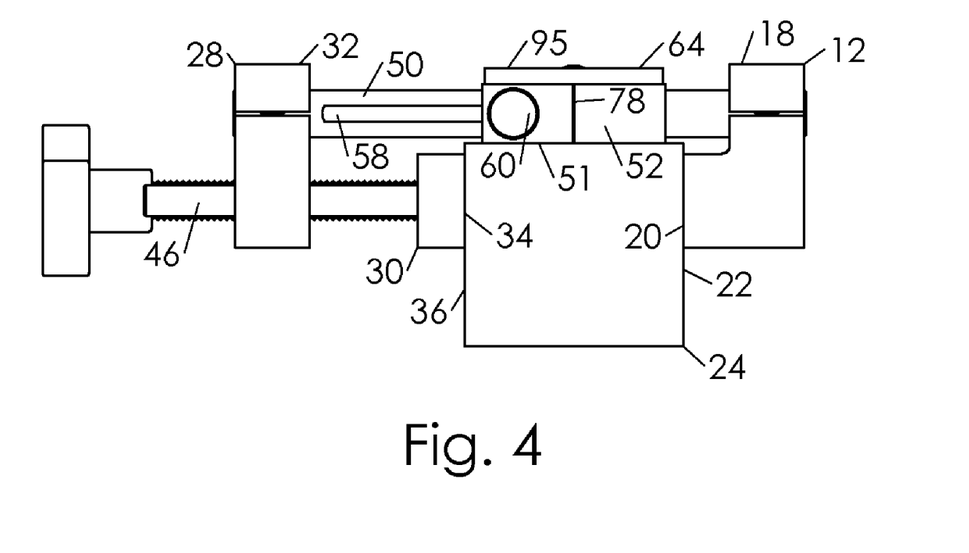
FIG. 4 is a side view of the exemplary embodiment of FIG. 1 shown clamped to a workpiece.

Referring to FIG. 4, the movable jaw 30 is located below the bottom surface 51 of the template carriage 52. The space between surfaces 34 of movable jaw 30 and surface 20 of fixed jaw 12 composes a workpiece gap between which workpiece 24 is clamped. This illustrative jig is designed so that the workpiece gap is sufficiently large enough to allow clamping of common sized workpieces found in frame-type furniture construction, but other embodiments with larger or smaller workpiece capacities can also be constructed.

Referring to FIG. 1, two parallel guide rods 50 connect the fixed jaw 12 to the movable jaw assembly 26, are preferably made of stainless steel, and provide a means for slidably attaching the template carriage 52. The guide rods 50 are inserted into 4 through bores 55 formed in bracket 28 and fixed jaw 12 and secured via a clamping means accomplished with 4 screws 54 and 4 slits 56. The four guide rods 50 could clearly be attached to the fixed jaw 12 and/or the movable jaw assembly 26 by other means. Flat surface 58 is a preferable feature and is formed on at least one of guide rods 50 to maximize the surface area engagement of thumb screw 60.

Referring to FIG. 2, the template carriage 52 is preferably a rectangular solid in shape, preferably made of aluminum and has a flat rectangular top surface 63 upon which a template (not shown) can be removably attached using using two tapped holes 65. While the illustrative template carriage 52 is generally a rectangular solid in shape, clearly the shape can be varied, e.g., with shapes that differ from generally rectangular but provide the same function. Dowel pins 66 are use to repeatably and accurately locate the template (not shown) onto template carriage 52. Clearly other suitable means besides dowel pins 66 could be employed to repeatably and accurately locate the template to the template carriage 52, e.g., using screws with alignment lands near the heads.

Referring to FIG. 1, the template 64 is attached to the template carriage 52 with two screws 68. Two through bores 70 allow template carriage 52 to be slidably attached to guide rods 50. Referring to FIG. 2, slot 74 is formed along the length of template carriage 52 so that the bit of a plunge router can pass and is formed to create as large a volume as possible for the accumulation of waste chips formed when routing, but not wider than the minimum material thickness that the jig is designed to accommodate. Slot 74 is formed to be larger than slot 90 (not shown) of template 64 (not shown) so as not to interfere with a template guide bushing (not shown) inserted into slot 90 of template 64. First registration feature 76 is an approximately triangular extruded solid in shape and is formed integrally on the walls of slot 74 so as to be centered on the length of template carriage 52. Registration feature 76 is designed to protrude into slot 74 but not interfere with the cutting bit of a plunge router. It is preferable that first registration feature 76 be formed as an integral part of template carriage 52 but could clearly be made and attached as a separate part(s).

Referring to FIG. 1, second registration feature 78 is an engraved feature formed vertically on lateral surfaces 80 of template carriage 52 so as to be centered on the width of the template carriage 52. Thumb screw 60 passes through a threaded hole formed on lateral surface 80 and can engage flat surface 58 formed on guide rod 50. The bottom surface 51 of template carriage 52 serves as a datum and is registered to the top surface 89 of workpiece 24. Template carriage 52 is presently made of aluminum, but could be made of other suitable material such as steel, bronze, plastic, and/or plastic composites.

Referring to FIG. 1, the template 64 is preferably made from thin, plastic material such as acrylic or polycarbonate and has a slot 90 formed along its length and normal to its top surface. The interior walls 91 of slot 90 serve as a bearing surface for guiding a plunge router fitted with a commonly available template guide bushing (not shown). Slot 90 is formed so that imaginary centerlines (not shown) through the length and width of slot 90 intersect registration features 78 and 76, respectively, formed on template carriage 52. Each jig is preferably supplied with a number of templates 64 with slot 90 formed in various lengths to allow the user to form mortises of various sizes.

Figures 3A, 3B:
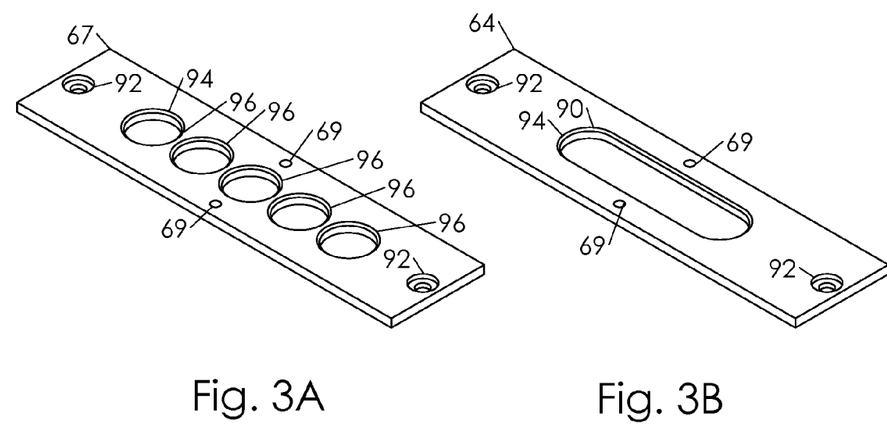
FIG. 3A shows an exemplary doweling template that extends the functionality of the present jig.
FIG. 3B shows an exemplary mortising template.

Referring now to FIG. 3A and FIG. 3B, each of the illustrative templates 64 (FIG. 3B) and 67 (FIG. 3A) are formed with two holes 69 that provide a locational fit with dowel pins 66 (not shown) of template carriage 52 (not shown). Each of the illustrative templates 64 and 67 are formed with with two screw clearance holes 92 so as to be removably attachable to template carriage 52 (not shown) via screws 68 (not shown). It should be obvious that fastening mechanisms other than screws could be employed to removably attach the template 64 to the template carriage 52. A variation of template 64, numbered 67, is shown in FIG. 3A, and is formed with a series of equally spaced through holes 96, the purpose of which is to locate and guide the bit of a plunge router fitted with a template guide bushing relative to a workpiece to form a dowel hole or a series of dowel holes. In this embodiment 5 through holes 96 are shown but clearly the number could be varried. In this embodiment, chamfer 94 is formed along the edges of slot 90 and along the edges of holes 96 and allows the user to more easily insert a template guide bushing (not shown) fitted to a plunge router (not shown) which can some times be a blind mating.

Referring to FIG. 4, to prevent an over-constrained mating of the plunge router base plate (not shown) to the pair of coplaner tool support surfaces 18 and 32 of fixed jaw 12 and bracket 28 respectively, it is preferable that the top surface 95 of template 64 be parallel to, but below the pair of coplanar surfaces 18 and 32 of fixed jaw 12 and bracket 28 respectively.

Referring to FIG. 1, it is preferable that the bottom portion 16 of fixed jaw 12 be sized such that when template carriage 52 is moved to contact upper surface 99 of fixed jaw 12, the template slot 90 of template 64 will be centered on the thickness of a workpiece that is the minimum thickness that the jig will accommodate without shims.

Referring to FIG. 1, first layout line 82 is made by the user and referenced from the edge 25 of the workpiece 24. Second layout line 84 is made by the user and referenced from edge 86 of workpiece 24. To form mortise 88 in workpiece 24, the user of the jig would attach template 64 to template carriage 52 and register the bottom surface 51 of the template carriage 52 with the top surface 89 of workpiece 24. The user would then register surface 20 of fixed jaw 12 with surface 22 of workpiece 24. The user would then position the template carriage 52 so that registration feature 78 is coincident with layout line 82 and turn thumb screw 60, locking template carriage 52 along guide rods 50. The user would then position the jig 10 so that registration feature 76 is coincident with layout line 84 and tighten knob 40 thus securing workpiece 24 in the workpiece gap. The user would then proceed to use a plunge router fitted with a template guide bushing and rout the mortise.

Figures 5A, 5B:
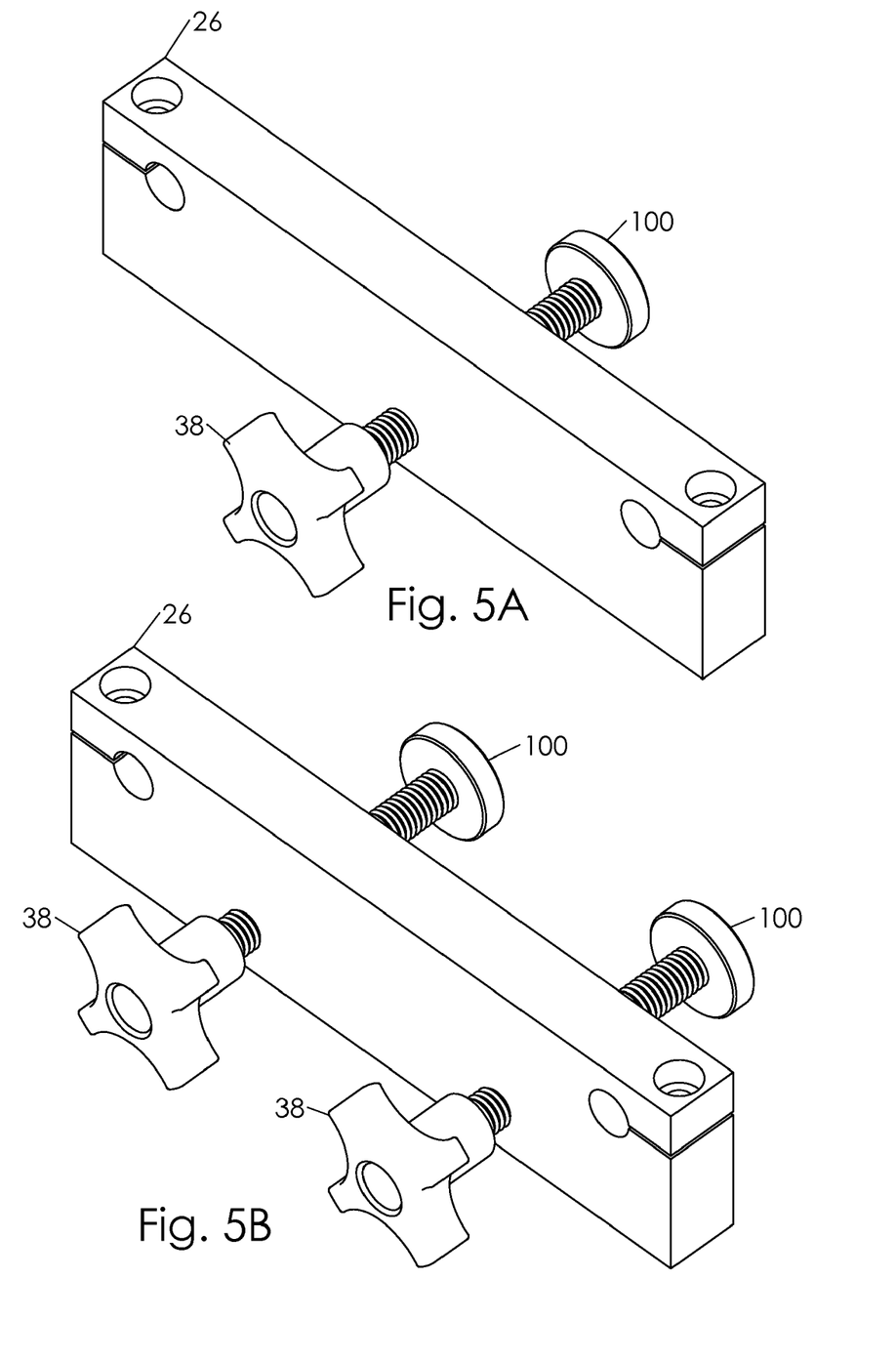
FIG. 5A shows an embodiment with two adjustment screws and FIG. 5B shows an embodiment with a single adjustment screw.

FIG. 5 shows two alternate movable jaw assembly designs suitable for use with the fixed jaw and template carriage of FIGS. 1-4 as well as with other fixed jaw designs. In FIG. 5A, the alternative embodiment of the movable jaw assembly 26 differs from the embodiments shown in FIGS. 1-4 by not incorporating the elongated movable jaw and instead using a knob assembly 38 terminated with swivel pad 100. Swivel pad 100 would therefore replace the movable jaw as the workpiece bearing member. Referring FIG. 5B, the alternative movable jaw assembly again differs from the embodiment shown in FIGS. 1-4 by not incorporating the movable jaw and instead using two knob assemblies 38. Both knob assemblies 38 are terminated by swivel pads 100 which serve as workpiece bearing members. Of course, other moving and tensioning mechanisms than screw adjustors may be used in similar designs.

The present mortising jigs may be formed of a variety of different materials. In many cases, metals such as aluminum, steel, bronze, and the like will be used. However, in some cases, it will be desirable to have at least some parts of the jig formed of plastic, which may be fiber-reinforced. When such plastics are used, it may be desirable to increase the durability by including some metal parts, e.g., metal slide rods, threaded rods, threaded female inserts, and the like. The components may be formed using any of a variety of forming techniques suitable for the particular material and component design, e.g., cutting with rotary cutters, water, and/or laser, grinding, extruding, molding, and the like. One skilled in the art of forming device components can readily select a suitable forming method or methods.

As to a further discussion of the manner of usage and operation of the present invention, the same should be apparent from the above description. Accordingly, no further discussion relating to the manner of usage and operation is provided.

With respect to the above description then, it is to be realized that the optimum dimensional relationships for the parts of the invention, to include variations in size, materials, shape, form, function and manner of operation, assembly and use, are readily apparent to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, the invention is not limited to the exact construction and operation shown and described, and accordingly, all suitable modifications and equivalents may be resorted to, falling within the scope of the invention. It is to be understood that the invention is not limited in its application to the details of construction and to the arrangements of the components set forth in the preceding description or illustrated in the drawings. The invention is capable of other embodiments and of being practiced and carried out in various ways. Also, it is to be understood that the phraseology and terminology employed herein are for the purpose of the description and should not be regarded as limiting.

All patents and other references cited in the specification are indicative of the level of skill of those skilled in the art to which the invention pertains, and are incorporated by reference in their entireties, including any tables and figures, to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, variations can be made to the shapes of the jaws and template carriage, as well as the materials used to construct them. In addition, while the embodiment illustrated incorporated generally solid structures, e.g., for the jaw assemblies and the template carriage, structures with cavities and/or perforations can also be utilized. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Thus, additional embodiments are within the scope of the invention and within the following claims.

What is claimed is:

1. A clamp-type mortising jig for use with a router, comprising:
   a clamp that includes a movable jaw assembly and a fixed jaw connected by a pair of guide bars upon which a template carriage is slidably mounted, wherein
   said fixed jaw comprises an elongated structure having a long side, a first end and a second end, a top surface providing a tool support for the baseplate of a plunge router, and a front surface providing substantial area for engaging a workpiece;
   said movable jaw assembly comprises an elongated clamp support structure having a long side, a first end and a second end, a flat top surface coplanar with the top surface of the fixed jaw, and providing a tool support for the baseplate of a plunge router, and adjustably attached thereto a movable jaw comprising an elongated structure having a front surface for engaging a workpiece and a moving and tensioning mechanism, wherein said front surface of said movable jaw is substantially parallel to the front surface of said fixed jaw; and one of said guide bars is connected to said fixed jaw and said movable jaw support structure proximal to their first ends and the other of said guide bars is connected to said fixed jaw and said movable jaw support structure proximal to their second ends;

said template carriage comprising an elongated structure slidably attached to said guide bars and having a longitudinal slot, a fastening mechanism for removably attaching a mortising template, at least one guide bar lock, and registration features for aligning the jig to layout lines on a workpiece, wherein said mortising template comprises a flat sheet having a slot formed therein for guiding a plunge router fitted with a template guide bushing: and wherein the pair of guide bars are oriented substantially perpendicular to:
the front surface of the movable jaw;
the front surface of the fixed jaw; and
the long side of the moveable jaw assembly; and wherein the long sides of the fixed jaw and moveable jaw assembly are oriented substantially parallel to the front surface of the moveable jaw and workpieces to be mortised, so that the baseplate of a plunge router can move across the tool support surface as the workpiece is being mortised while being continuously supported by both the fixed jaw and the moveable jaw assembly during the entire routing of a mortise in the workpiece.

2. The mortising jig of claim 1, wherein said movable jaw further comprises guide bars which extend through and slide within apertures in said movable jaw support structure, thereby maintaining orientation of said movable jaw as said movable jaw is adjusted:

wherein the top surfaces of the fixed jaw and moveable jaw assembly comprise surfaces free of objects extending above the surfaces, so that the baseplate of a plunge router can smoothly move across the tool support surface as the workpiece is being mortised;

wherein the connection between the fixed jaw and the moveable jaw assembly is positioned below the plane defined by the top surfaces of the fixed jaw and moveable jaw assembly; and wherein the template carriage configured such that when a template is attached to the template carriage, the template is either coplanar with or below the plane defined by the top surfaces of the fixed jaw and moveable jaw assembly.

3. A clamp-type mortising jig for use with a router, comprising a clamp that includes a movable jaw assembly and a fixed jaw connected by at least one alignment connector, and between which a template carriage is repositionably mounted, said fixed jaw comprising a fixed jaw body comprising a long side and a top tool support surface and substantially perpendicular to a substantially flat workpiece bearing surface; and said movable jaw assembly comprising a long side, a top tool support surface and an adjustable clamp member that is substantially parallel to said workpiece bearing surface of said fixed jaw, wherein said clamp holds a workpiece between said workpiece bearing surface and said adjustable clamp member, allowing a router resting on said tool support surfaces to produce a cut in said workpiece defined by a template in said template carriage; and wherein the alignment connector is oriented substantially perpendicular to:
the long side of the fixed jaw;
the long side of the movable jaw assembly;
the clamp member; and
the long side of the workpiece bearing surface;

wherein the long sides of the fixed jaw and moveable jaw assembly are oriented substantially parallel to the clamp member and the long side of the workpeice bearing surface, so that the baseplate of a plunge router can move across the top tool support surfaces as the workpiece is being mortised while being continuously supported by both the fixed jaw and the moveable jaw during the entire routing of a mortise in the workpiece.

4. The mortising jig of claim 3, wherein said templates are replaceably mounted in said template carriage; and wherein the top tool support surfaces of the fixed jaw and moveable jaw assembly comprise surfaces free of objects extending above the surfaces, so that the baseplate of a plunge router can smoothly move across the tool support surface as the workpiece is being mortised; and wherein the connection between the fixed jaw and the moveable jaw assembly is positioned below the plane defined by the top tool support surfaces of the fixed jaw and moveable jaw assembly.

5. The mortising jig of claim 3, wherein said movable jaw assembly further comprises a top tool support surface.

6. The mortising jig of claim 3, wherein said alignment connector comprises two alignment bars.

7. The mortising jig of claim 6, wherein said alignment bars also comprise guide rods upon which a template carriage is slidably mounted.

8. The mortising jig of claim 7, wherein at least one of said guide rods comprises a flattened side and said template carriage comprises a position lock which bears against said flattened side.

9. The mortising jig of claim 7, wherein said template carriage comprises an elongated structure having a longitudinal slot, a fastening mechanism for removably attaching mortising templates, at least one guide rod lock, and registration features for aligning the jig to layout lines on a workpiece.

10. The mortising jig of claim 7, wherein said alignment bars are round rods passing through close tolerance apertures in said template carriage.

11. The mortising jig of claim 7, wherein said template comprises a flat sheet removably attached to the template carriage and having a slot formed therein for guiding a plunge router fitted with a template guide bushing.

12. The mortising jig of claim 3, wherein said movable jaw assembly comprises a bracket comprising an elongated structure having a flat top surface coplanar with the top surface of the fixed jaw and providing a tool support surface for the baseplate of a plunge router, and adjustably attached thereto a movable jaw comprising an elongated structure having a surface for engaging a workpiece and a moving and tensioning mechanism.

13. The mortising jig of claim 12, wherein said moving and tensioning mechanism comprises an adjustment screw fitted within a threaded through bore in said elongated structure.

14. The mortising jig of claim 3, wherein said template carriage comprises at least one workpiece alignment feature.

15. The mortising jig of claim 14, wherein said alignment feature is placed for aligning a workpiece in a direction parallel to said workpiece bearing surface of said fixed jaw.

16. The mortising jig of claim 15, wherein said alignment feature comprises a formed pointer projecting from a wall of a slot in said template carriage.

17. The mortising jig of claim 15, wherein said alignment feature is located on an outer side surface of said template carriage.

18. The mortising jig of claim 14, wherein said alignment feature is placed for aligning said template carriage at a desired position in a direction perpendicular to said workpiece bearing surface of said fixed jaw.

19. The mortising jig of claim 14, wherein an alignment feature is placed for aligning a workpiece in a direction parallel to said workpiece bearing surface of said fixed jaw, and an alignment feature is placed for aligning said template carriage at a desired position in a direction perpendicular to said workpiece bearing surface of said fixed jaw.

* * * * *